United States Patent
Dame et al.

(10) Patent No.: US 9,706,242 B2
(45) Date of Patent: Jul. 11, 2017

(54) SYSTEM FOR CACHING AND DISTRIBUTION OF CLOUD BASED SPATIAL IMAGERY TO MULTIPLE VIEW PORTS

(71) Applicant: The Boeing Company, Chicago, IL (US)

(72) Inventors: Stephen Gregory Dame, Everett, WA (US); Yakentim M. Ibrahim, Brier, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/933,916

(22) Filed: Nov. 5, 2015

(65) Prior Publication Data

US 2017/0134786 A1    May 11, 2017

(51) Int. Cl.
| | |
|---|---|
| *H04N 21/235* | (2011.01) |
| *H04N 21/414* | (2011.01) |
| *H04N 21/214* | (2011.01) |
| *H04N 21/231* | (2011.01) |
| *H04N 21/431* | (2011.01) |
| *H04N 21/43* | (2011.01) |

(52) U.S. Cl.
CPC ... *H04N 21/41422* (2013.01); *H04N 21/2146* (2013.01); *H04N 21/231* (2013.01); *H04N 21/235* (2013.01); *H04N 21/4302* (2013.01); *H04N 21/4318* (2013.01)

(58) Field of Classification Search
CPC combination set(s) only.
See application file for complete search history.

(56) References Cited

U.S. PATENT DOCUMENTS

| | | | |
|---|---|---|---|
| 6,314,363 B1 * | 11/2001 | Pilley | G01C 23/00 342/36 |
| 2008/0136839 A1 | 6/2008 | Franko et al. | |
| 2013/0169807 A1 | 7/2013 | De Carvalho et al. | |

FOREIGN PATENT DOCUMENTS

WO    WO 2007/093403 A1    8/2007

OTHER PUBLICATIONS

European Patent Application No. 16183088.0; Extended Search Report; dated Mar. 6, 2017; 9 pages.

* cited by examiner

*Primary Examiner* — Kieu Oanh T Bui
(74) *Attorney, Agent, or Firm* — Baker & Hostetler LLP

(57) ABSTRACT

An improved image display system configured to receive and display content, including one or more images and/or parametric data, associated with the flight trajectory of an aircraft is described herein. At least one or more images of the sky and/or earth may be retrieved and stored in an aircraft. Based on the location of the aircraft, the image display system selects a subset of the one or more stored images and displays the subset of the one or more images to at least one interior surface in the aircraft such that passengers may experience the imagery of the open sky or earth while in-flight.

15 Claims, 6 Drawing Sheets

SYSTEM FOR CACHING AND DISTRIBUTION OF CLOUD BASED SPATIAL IMAGERY TO MULTIPLE VIEW PORTS

TECHNICAL FIELD

The present invention relates generally to entertainment systems for aircraft and other vehicles for transportation, and more particularly to a system for automatically displaying dynamic images, e.g., representing the open sky or a moving map of celestial objects, while the vehicle is moving.

BACKGROUND

Airplane cabins have historically been configured to provide passengers with entertainment systems through on-board projector screens or display screens located on individual seat backs. However, passengers generally can be inundated with the entertainment options and seek to view something more real. Thus, there exists a need to provide passengers with an alternative mode of entertainment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One way to provide aircraft passengers with additional entertainment options, for instance, is to display one or more high resolution images that represent the sky outside the aircraft. Passengers typically watch and listen to entertainment programs through various mediums while in-flight. Additionally, passengers typically interact with an on-board Global Positioning System (GPS) application via a display screen to track the airplane. However, these entertainment mediums and applications often lack the ability to provide passengers with live or real-time images of the open sky or a moving map of celestial objects while in-flight.

An image or content display system configured to receive content associated with the flight trajectory of an aircraft, obtain a location of the aircraft, and based on the obtained location, display a subset of the content relative to the flight trajectory is disclosed herein. Having an image or content display system provides passengers with real-time open sky views and/or a moving map of celestial objects (e.g. planets, stars, galaxies, and comets). The content may create the illusion of an open sky or moving map of the celestial view above the flight trajectory. The content may be received at a server, stored in an on-board storage system, and further displayed on surfaces located inside the airplane cabin. Each of the displayed content may represent the current location of the aircraft while in-flight. Furthermore, the displayed content may be updated, in real-time, with additional images that represent deviations associated with the location of the aircraft.

In illustrative embodiments of the present invention, a system and method are provided for displaying content, including one or more images and/or parametric data, representing the open sky or a moving map of celestial objects while an airplane is in-flight. In these embodiments, the image or content display system includes one or more computing devices. The computing devices may comprise of one or more memories with computer-readable instructions such that, when the computing devices execute the instructions, content is received, stored, processed for synchronized distribution to multiple display mechanisms (e.g. projectors or display screens), and eventually displayed on at least one interior surface inside an aircraft cabin. The content is received by a server configured to receive content associated with the flight trajectory of the aircraft. Once the content is received, it is then transferred to an on-board storage system located in the aircraft. The content may represent images and/or parametric data associated with the flight trajectory. When in-flight, the content may be displayed on at least one interior surface in the aircraft. The content may continue to be updated, in real-time, based on changes to the location of the aircraft. Thereby, an improved interior cabin experience while flying may be provided to the passengers.

BRIEF DESCRIPTION OF DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EMBODIMENTS

Figure 1:
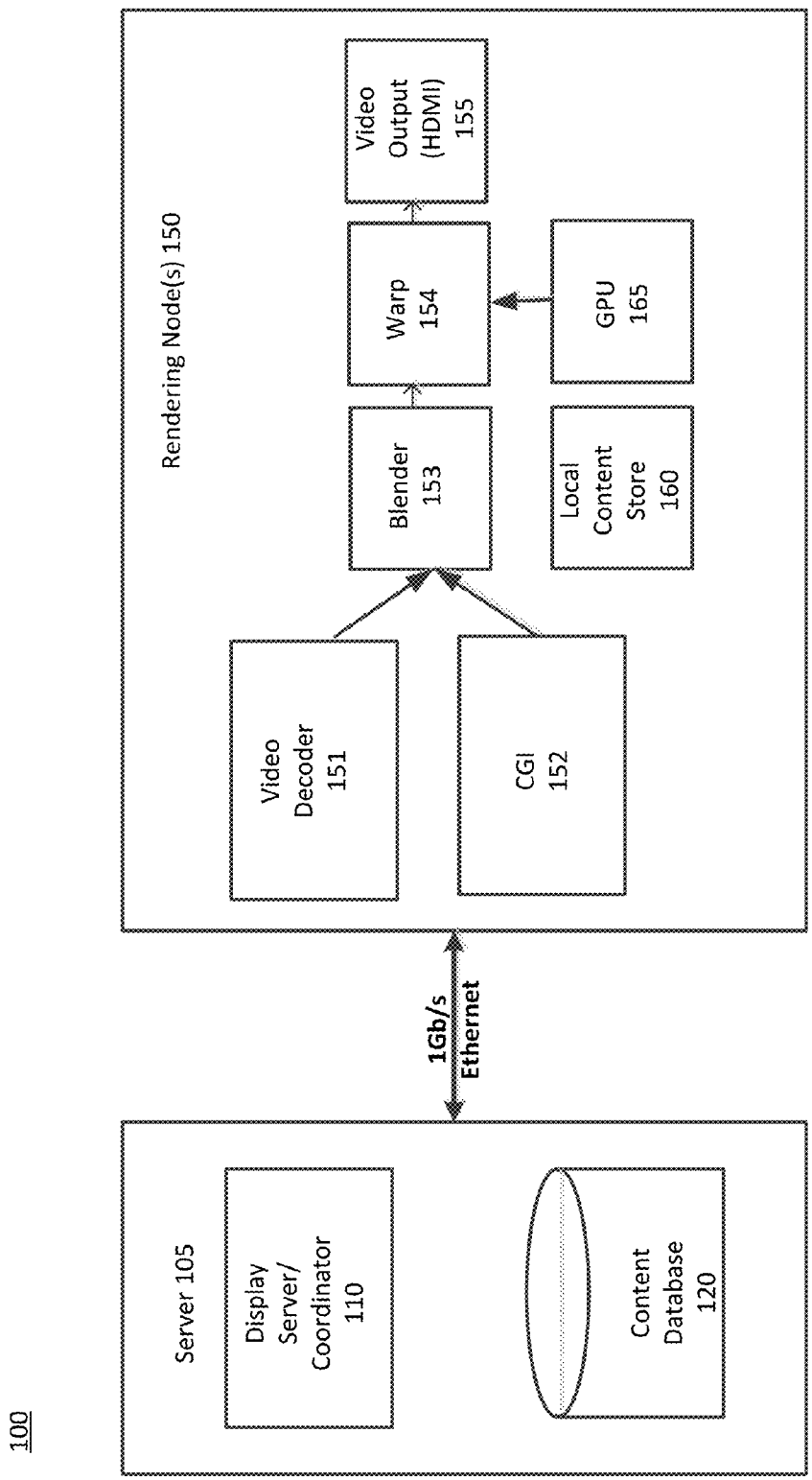
FIG. 1 is a block diagram depicting an image or content display system.

In airplanes where entertainment systems are used, there exists an increased demand for improvements in airplane cabin environments. The conventional systems, such as seat back display screens and/or projector screens, generally have drawbacks with limited options. For example, passengers may not be able to experience or see the open skies outside while flying. Thus, an image or content display system capable of rendering real-time images of the open skies or a moving map of the celestial objects may be advantageous.

Future airplane cabins may have a myriad of video pixel surfaces such as ceiling/side panels, galley/lavatory monuments, or floors. Video may be projected around curved surfaces or bent surfaces using advanced display screens, such as Organic Light Emitting Diode (OLED) displays. Thus, a system is needed to give the appearance of real-time images rendering at very high resolution in order to provide an illusion of an open sky or moving map of celestial objects. In some of these applications, external cameras may be used to translate outside views from multiple camera angles into video scenery on the surfaces. In other cases, still images could be rendered and synchronized with all display screens in real-time.

As technology in both airplane systems in general, and in the technology of airplane cabins in particular, becomes more advanced, it becomes more important to render or display content that represent the appearance of real-time sky images in an accurate yet high quality manner. Being able to receive content, including images and/or parametric data, primarily associated or in connection with the flight trajectory of an aircraft would decrease the overall time and storage space needed to store the representative sky images. Therefore, a system that receives content associated with the flight trajectory, stores the content, obtains the location of the aircraft, and selects a representative subset of the stored content to be displayed or rendered to passengers in-flight is preferred. The content may be displayed throughout the surfaces of the interior cabin of the aircraft. The surfaces may be comprised of curved and/or bent surfaces. The flight trajectory may include information related to the aircraft's flight plan and also information related to the rotation and position of the earth.

Disclosed herein is a method and system with a unique and improved mechanism for providing passengers with real-time images of the sky associated with the location of the aircraft during flight. Various systems, methods, and computer program products may be employed in conjunction with the practice of various aspects of the present disclosure. Aspects of the present disclosure may be employed in an improved interior cabin experience for newly manufactured airplane models or retrofitted into current airplane models. This may comprise of receiving content, including at least one or more images and/or parametric data, at a head-end server, associated with the flight trajectory. The content may be stored either internally in the aircraft or in an external storage system separate from the aircraft. A selection of a subset of the stored content, based on the location of the aircraft, may be performed. The selected content may then be displayed in an interior cabin of an aircraft while in-flight. In other words, based on the location of the aircraft, the image display system may select a subset of the stored content to be displayed on interior surfaces of the airplane. The displayed content may represent images of the outside sky of the aircraft's current location while en route to its destination. The content may be updated for unexpected circumstances, and additional images may be added to the content to show other activities occurring outside of the aircraft while in-flight. Industries, companies, and individuals may all leverage such an approach to improve the in-flight cabin experience for any passenger aircraft.

Referring now to FIG. 1, an image or content display system 100 suitable for receiving content associated with a flight trajectory of an aircraft and further parsing the content to distributed rendering nodes 150 for display inside an aircraft is illustrated. The server 105 includes one or more signal and image processing units and related system memory (both random access memory and read only memory) that are structurally and functionally interconnected in a conventional manner, but not shown for ease of illustration. Programs for processing images or data stored in system memory are also not shown. Images or data used during operation of the image display system 100 are stored in system memory and/or a content database 120.

A content database 120 may be configured to store content in the server 105. As is known to those skilled in the art, the content database 120 may be configured to receive various images from numerous cloud based or third-party databases via a wireless or wired connection. The cloud or third-party databases may include images from Google® Sky, images from National Aeronautics and Space Administration (NASA), and/or other public cloud based collections or image databases. Received images from the cloud or third-party databases may include three-dimensional (3D) spatial images, images of the sky, and/or images of the earth that are associated with the flight trajectory of the airplane. The content database 120 may be configured to receive only a portion of images related to the flight trajectory of the aircraft and not the entire cloud or third-party database of images. This way, only a limited or small portion of images are downloaded or received for storage.

The display server/coordinator 110 may render or direct the content, stored in the server 105 and in particular stored in the content database 120, to the rendering nodes 150 located in the aircraft. The display server/coordinator 110 in server 105 may be configured to instruct or direct which content, based on the current location of the aircraft, is to be displayed in the aircraft. The selected content are then synchronized and directed to specific rendering nodes 150 interconnected with display screens (not depicted here, but pictured in FIG. 2) for display. The content may be a subset of one or more images that are stored in the server 105. As described in the above, the selected content may comprise of a subset of images including 3D spatial images, images of the sky, and/or images of celestial objects relative to the location and flight trajectory of the aircraft. As is known to those skilled in the art, the types of images as listed above are non-limiting examples. Other types of images may also be utilized.

The rendering nodes 150 are configured to receive instructions and/or signals of the content that are ready for display. The content may be transferred over an Ethernet network connection with 1 GB/s bandwidth. As is known to one skilled in the art, other sizes of bandwidth may be utilized to transfer signals between various computing devices. Furthermore, the content may be transferred via a wireless or wired connection.

Continuing to refer to FIG. 1, the rendering node 150 may also be referred to as an embedded computing platform. As is known to others skilled in the art, other types of computing nodes, processors, and/or computing devices may be utilized to receive image or content signals. Rendering nodes 150 may include onboard memory (e.g. high capacity Solid State Device (SSD)) for local storage of content as an alternative to content stored on the server 105. A video decoder 151 may be implemented in a rendering node 150 to decode the incoming image or content signals. The video decoder 151 may first be configured to receive compressed video stream (e.g., H.264 based video) image signals and convert them to digital image signals. The rendering node 150 may be composited with computer-generated imagery (CGI) software 152 to process the content to generate images. The image signals from either a video decoder 151 or CGI 152 may then be directed to a blender 153, then a warp 154, and eventually a video output 155. The blender 153 may be a software or hardware accelerated computing element used for acting on the alpha channel of an image when blending the edges of adjacent images in a multiple display digital signage configuration. CGI 152 may be utilized to create scenes or special effects in conjunction with the images received or even model complete virtual worlds such as gaming engines (e.g. Unity®, Unreal Engine®). Further, the warp 154 operation applies surface inverse distortion correction to a Graphics Processing Unit (GPU) 165 based on a specification file for the geometry of the architectural surface video may be projected onto. The GPU 165 may be configured to feed warping specifications to the warp 154. The video output 155 may comprise a Digital Visual Interface (DVI), High-Definition Multimedia Interface (HDMI), or Universal Serial Bus (USB) connection configurable to be connected with a display screen. As is known to others skilled in the art, various other output connections may also be utilized as video output 155. A local content store 160 may also be implemented in a rendering node 150 so that content that were previously stored or processed through the rendering node 150 may continue to be cached.

The image or content display system 100 described above may be configured to provide content, including one or more images and/or parametric data, to the rendering nodes 150 based on the current location of an aircraft. Once received, the rendering nodes 150 located inside the aircraft may then display, generate, or render the content on various curvatures or interior surfaces of the aircraft via projectors or display screens (not pictured here, but pictured in FIG. 2A). The description of displaying the content is discussed in more detail in the description of FIGS. 2-4 below.

Figure 2A:
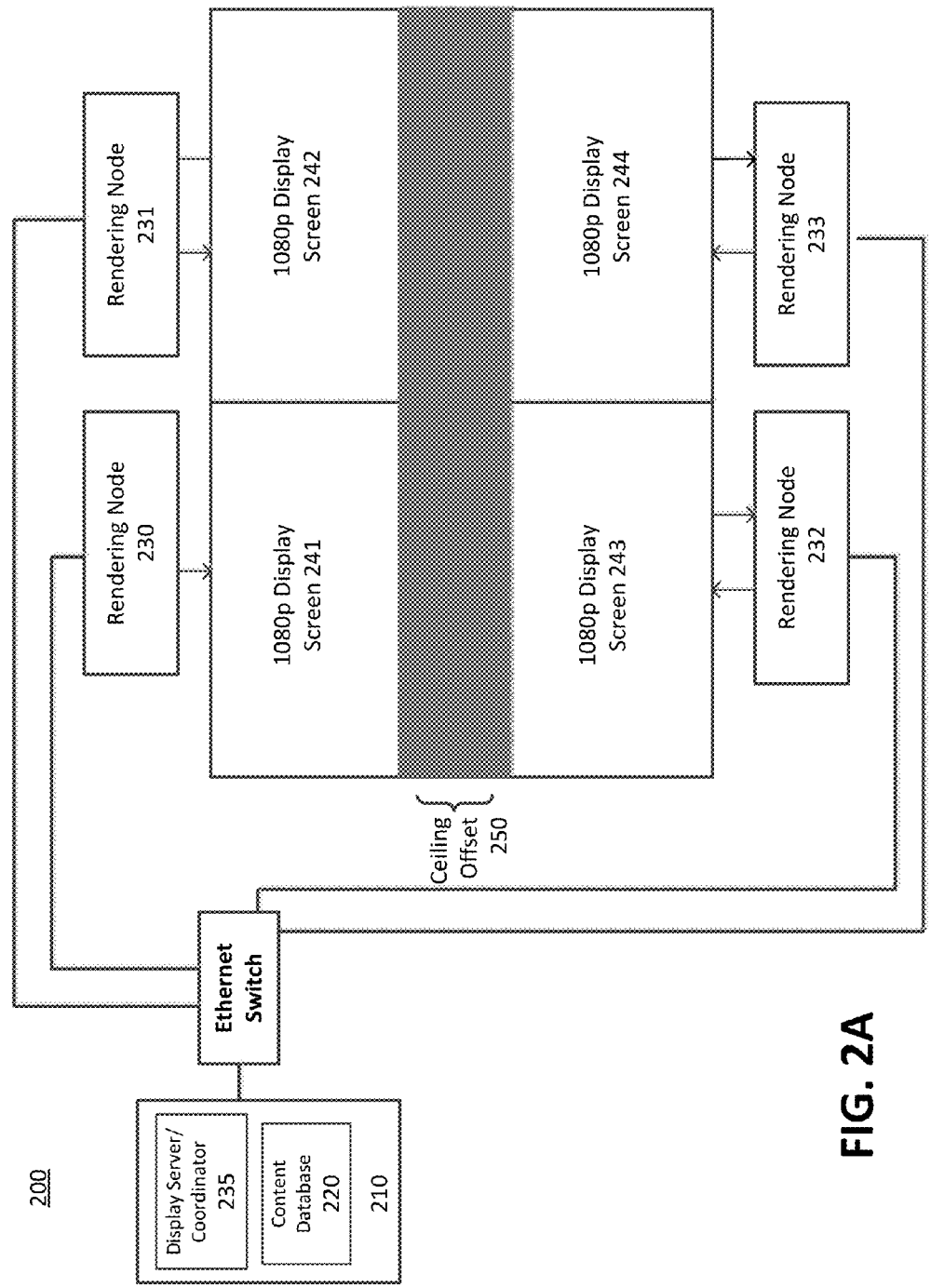
FIG. 2A is a block diagram depicting an image or content display system interconnected with rendering nodes and display screens.

FIG. 2A illustrates a presently preferred embodiment of the image or content display system 200 interconnected with one or more display screens 241-244. The image display system 200 receives content associated with the flight trajectory of the aircraft and stores the content either in an on-board storage device (content database) 220 or in a remote storage location (not pictured). The image display system 200 then obtains a current location of the aircraft. Based on the obtained location, the image display system 200 may select a subset of content associated with the obtained location of the aircraft. Thereafter, the selected content may be displayed on interior surfaces of the aircraft via display screens 241-244. The display screens may be separated by a ceiling offset 250 located between display screen 214-242 and 243-244. In the preferred embodiment, a head-end server 210 receives the content, including one or more images and/or parametric data, from an image database (not pictured). As described previously, image tiles or content may be downloaded from public cloud based collections (e.g., Google® Sky or NASA). As is known to those skilled in the art, other public cloud based collections or image databases may be used to retrieve or download the content. The received content are generally related only to the aircraft's flight trajectory. That way, the content database 220 in the server 210 is not inundated with large files of images representing the entire open sky of the world. By receiving only relevant portions or relevant content associated with the flight trajectory of the aircraft, the content may then be locally stored in an aircraft without the need for a large storage device or the need for large storage space. Storing the content in an on-board storage system 220, inside an aircraft, allows images and/or data to be quickly transferred to display screens 241-244. Thereby, the need to connect to a separate/remote server or computing system located outside of the aircraft may be avoided.

As an alternative embodiment the server 210 and/or distributed rendering nodes 230-233 may be utilized to compute a synthetic spatial imagery to augment or supplement the real images received. The modeling of this imagery could utilize same position information combined with a sparse application of actual images to create or model additional frames of images from a virtual world palette.

Another use of position information and environmental imagery would be to render scenery relevant to the departure, en route or destination locations such as landmarks, points of interest, cultural image textures, advertisement or other important images to improve situational awareness. The data input for these images can be cached, freshened, and/or updated based on aircraft location.

Furthermore, the storage of the content in the on-board storage system 220 may only include images that have not been previously stored. In other words, images that have been previously stored in the aircraft within the last 24 hours, for instance, may continue to be in the storage system 220. If the received images are duplicates of the same images that are currently stored in the aircraft, then these images may not have to be stored again. Thereby, the on-board storage system 220 may be configured to store images on a time-based formula. For example, the on-board storage system 220 may only store images during 24 hour intervals. Or the on-board storage system 220 may store images based on the size of storage available. In other words, the on-board storage system 220 may store images until space runs out. In essence, the on-board storage system 220 may be configured to store images that are only relevant to the aircraft's flight trajectory.

The flight trajectory of the aircraft may include information related to the flight schedule, orientation, and/or direction of the aircraft. The flight schedule may provide the image display system 200 with information of the time and day of when the aircraft will be flying. The server 210 may receive this information related to the time and day associated with the aircraft's flight schedule. In some instances, the server 105 may also be configured to receive information related to any deviations from the flight schedule that may occur. The information related to the deviation in the flight schedule may prompt the server to store additional images that are related to any extensions related to the flight schedule. In other words, the server 105 may be configured to receive not only content, including images related to the flight schedule, but also any additional images that are related to banks, turns, and/or unexpected detours that the aircraft may perform while on its flight path. In the preferred embodiment, the flight trajectory may include information from the pre-determined flight plan associated with the aircraft and/or the rotations and position of the earth. The rotation and position of the earth relative to the flight path may provide the exact or close to exact location of the aircraft during the flight path. Based on this and the aircraft's flight schedule, the images of the sky may be downloaded and stored for eventual display.

Continuing to refer to FIG. 2A, the server 210 may process and synchronize the content prior to sending the content, including images, to rendering nodes 230-233. The display server/coordinator 235 may render or direct the content, stored in the server 210 and in particular stored in the content database 220, to the rendering nodes 230-233 via an Ethernet switch (network) located in the aircraft. The display server/coordinator 235 in server 210 may be configured to instruct or direct which content, based on the current location of the aircraft, is to be displayed in the aircraft. In another instance, the server 210 may also first send images to an on-board storage system 220. This may occur while the aircraft is on the ground. This may also occur while the aircraft is airborne such that images in the storage system 220 may continuously be updated. In the preferred embodiment, the images are first sent, while the aircraft is on the ground, to an on-board storage system 220. Once the aircraft is airborne and en route to its destination, images may then be selected from the on-board storage system 220 and directed to rendering nodes 230-233. Each rendering node 230-233 may receive a corresponding image signal from the on-board storage system 220. The rendering node 230-233 may also directly receive the image content, for local SSD storage, from the server 210 without first passing through the storage system 220. The rendering nodes 230-233 may be interconnected to display screens 241-244. In some instances, the images may directly be sent to display screens 241-244 without a rendering node 230-233 via a wireless or wired connection.

Figure 2B:
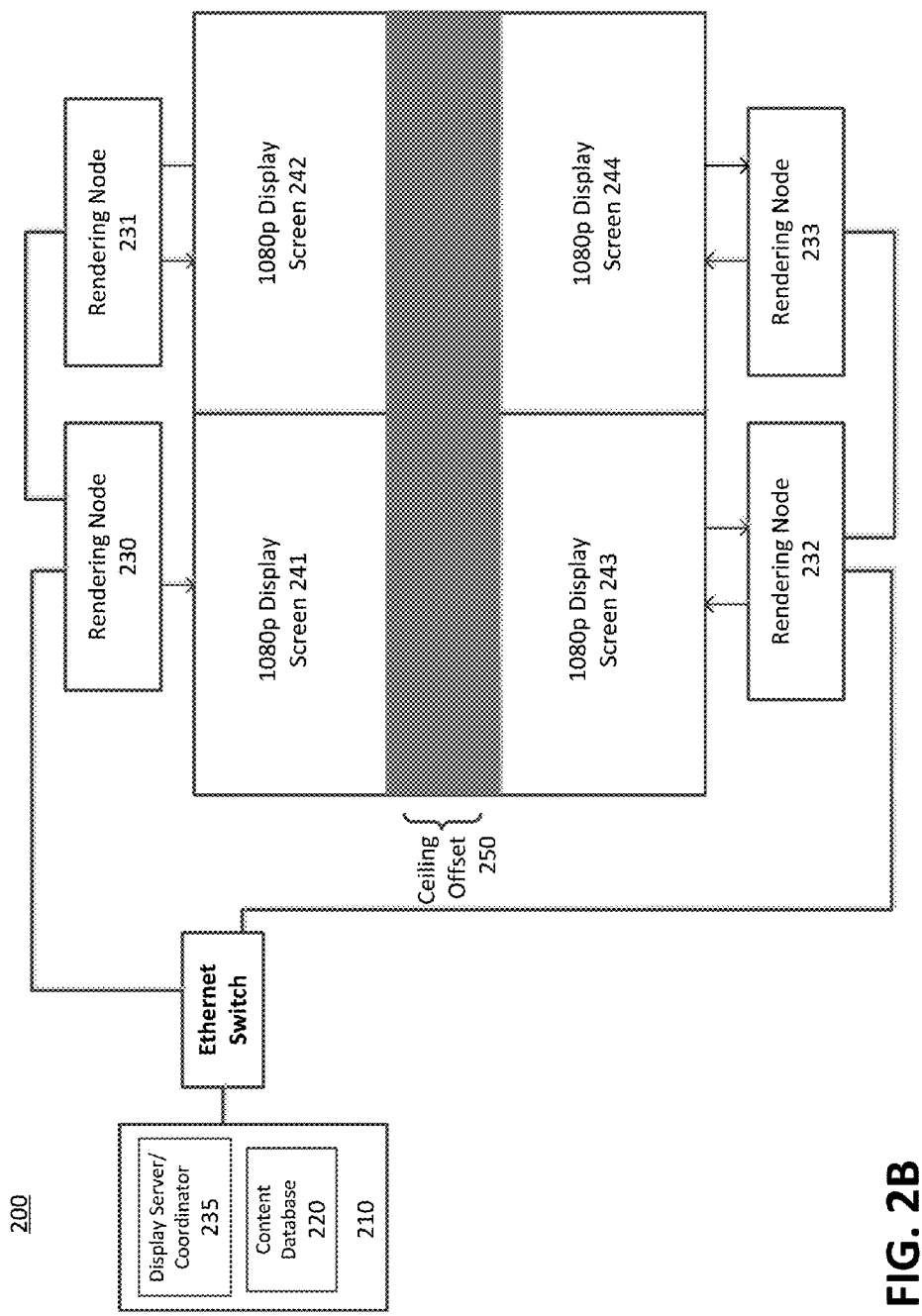
FIG. 2B is a block diagram depicting an alternate embodiment of an image or content display system interconnected with rendering nodes and display screens.

FIG. 2B illustrates an alternate embodiment where the rendering nodes 230-233 may be interconnected with each other such that if one rendering node (e.g., rendering node 232) receives the image signal, a second rendering node (e.g., rendering node 233) may receive the image signal from the interconnected rendering node 232 and not directly from the server 210 or the storage system 220.

The rendering nodes 230-233 which were described in detail with reference to FIG. 1 are configured to receive and process image signals for display. The display screens 241-244 located in the aircraft may include screens that are on curved surfaces or bent surfaces. The display screens 241-244 may also be a projector screen or a television screen equipped with typically 1080p resolution. However, as is known to one skilled in the art, the display screens 241-244 may be of any resolution (e.g., less than or more than 1080p) and configuration. In the preferred embodiment, the display screens 241-244 are located above the galley ways throughout the interior surfaces of the cabin.

It may be preferred to have the rendering nodes 230-233 interconnected with each display screen 241-244 so that each display screen 241-244 displays a subset of the one or more images that are stored in the server 210. The rendering nodes 230-233 may be configured to perform any one of: image alignment, image scaling, image registration, image processing, and image stitching prior to displaying the images. It may also be preferred that the display screens 241-244 are assembled into the interior cabin of newly modeled aircraft during manufacturing. The display screens 241-244 may also be individual television sets located in the armrest at each individual seat or on individual seat backs.

Figure 3A:
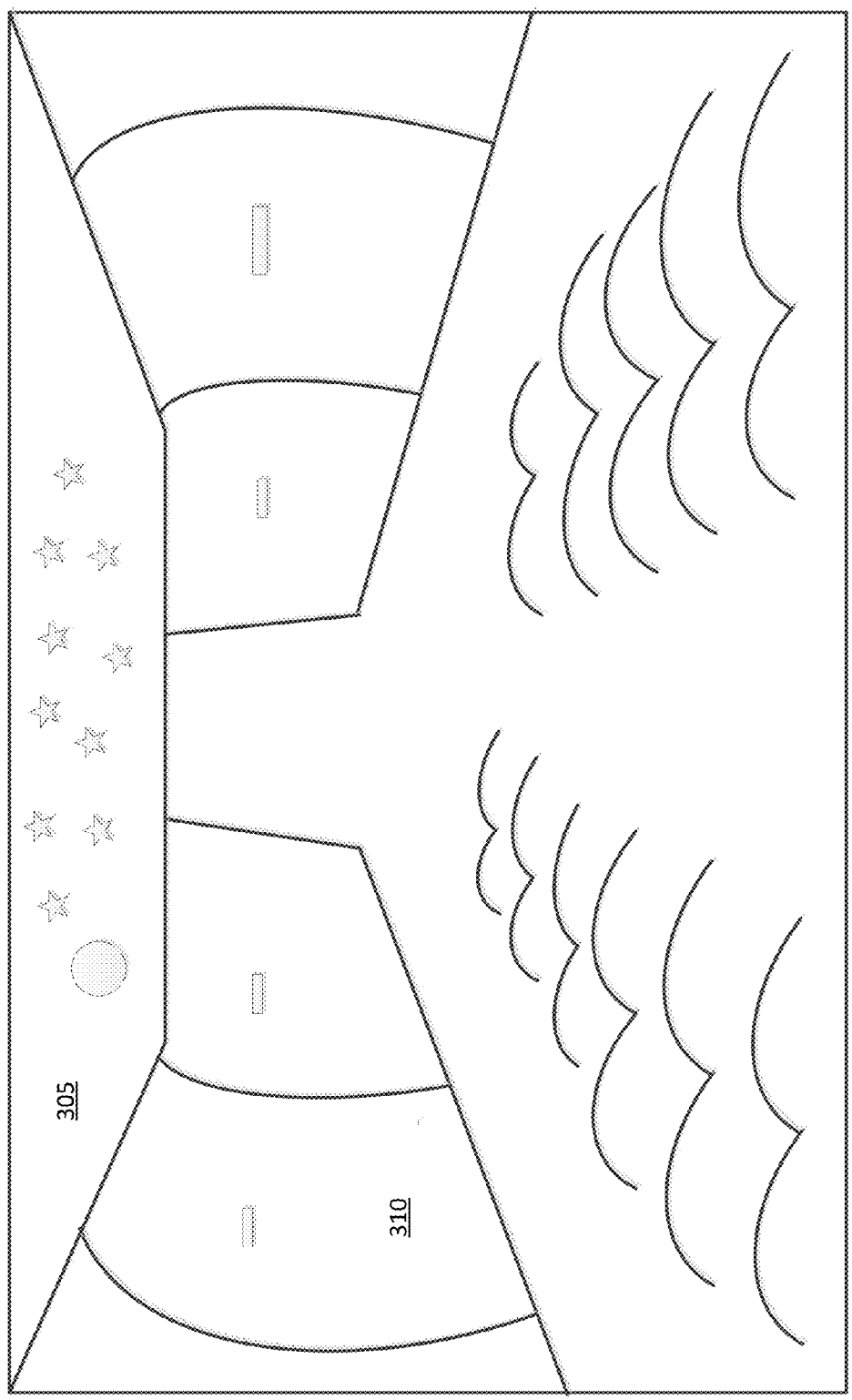
FIG. 3A illustrates an example embodiment of content displayed inside an aircraft cabin.

FIG. 3A illustrates an example of the preferred embodiment where real-time sky images (or a moving map of celestial images) 305 is displayed on the ceiling panels inside an airplane 300. In the preferred embodiment, the passengers of an aircraft may be presented with a subset of the one or more images that were previously downloaded and stored in the server. The images 305 presented here in FIG. 3 may be based on the current location of the aircraft. The images 305 may represent images of a night sky view including stars, moon, and/or planets. The images 305 may also be updated or refreshed continuously due to any changes of the aircraft's position while in-flight. The images may also be updated with "synthetic content." Synthetic content may be presented on top of the images that are already presented to the passengers or in addition to the images already presented. In other words, synthetic content may refer to additional content or a separate image on top of another image. The synthetic content may be acquired, in real-time, from a server located on the ground and the content or images may be transferred to the on-board rendering node for display, or images may be rendered in real-time on the rendering node given a set of virtual world modeling parameters. For example, if a second aircraft is flying above the aircraft, the display screens may be updated with image(s) of the second aircraft on top of the images that are presently displayed. The image(s) of the second aircraft may be referred to as the synthetic content.

Figure 3B:
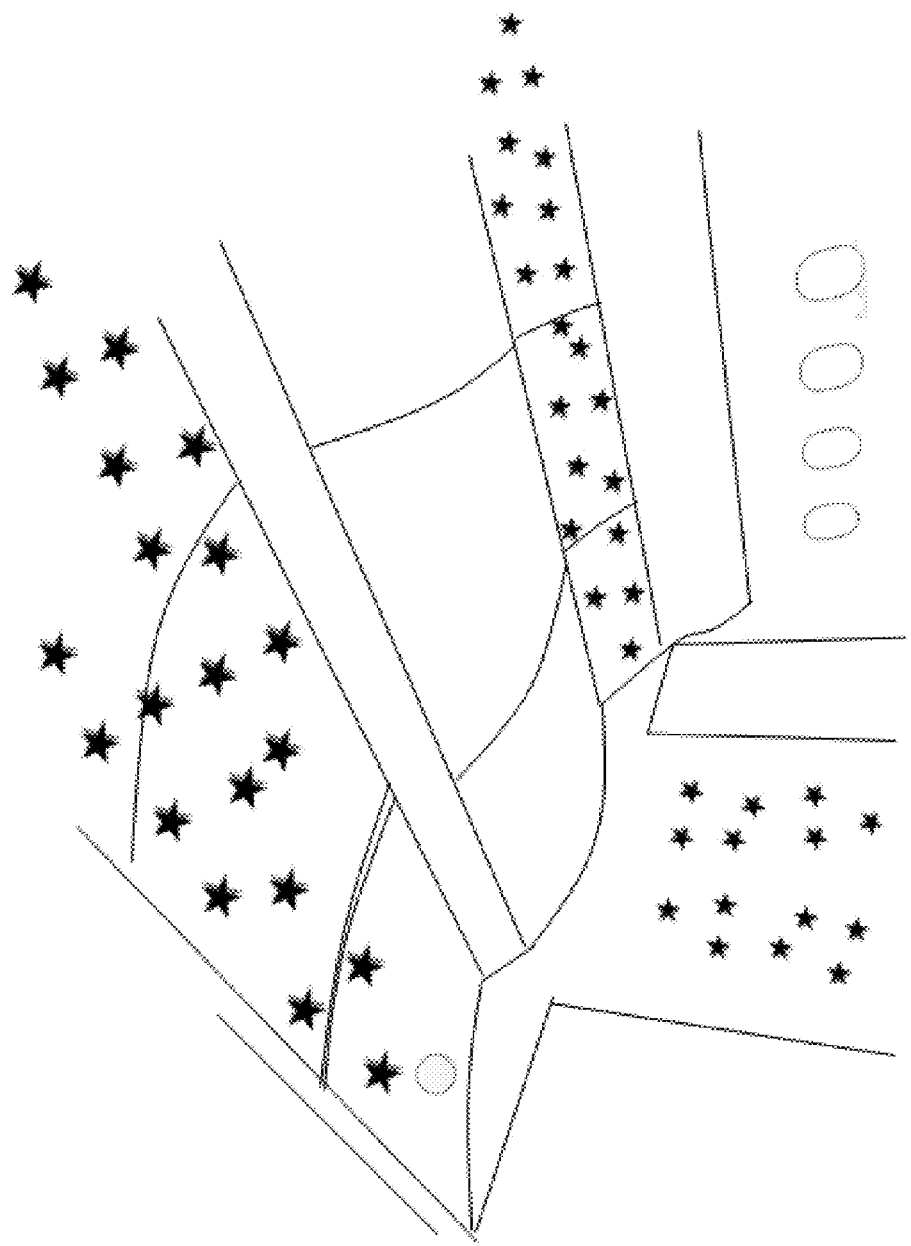
FIG. 3B illustrates another example embodiment of content displayed inside an aircraft cabin.

Referring to FIG. 3B, in another example embodiment, the window shades, side panels, and galley panels of the interior cabin may be configured to display images as well. In other words, there may be a plurality of possibilities to display images on surfaces inside an aircraft cabin.

Furthermore, the subset of one or more stored images may also be displayed on a display screen located in a suite or located on a seat back entertainment system for an individual passenger. This display screen may be implemented and modified to fit on the seatback of a first, business, premium, or economy class seat. Or the display screen may be an individual screen located inside a premium class suite. The images on the screen may represent the current view of the sky outside of the aircraft based on the location of the aircraft.

Figure 4:
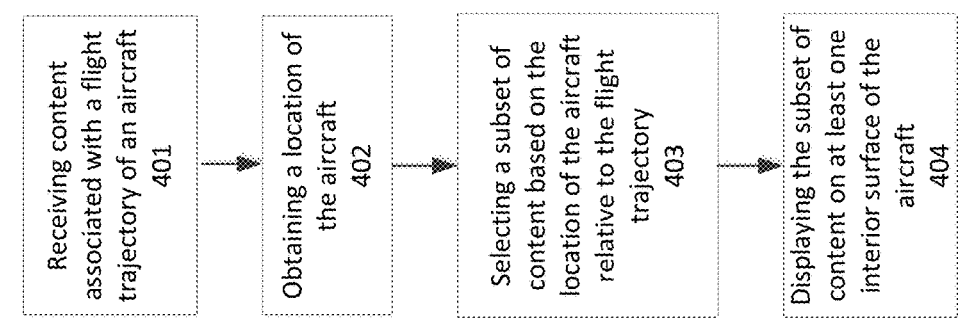
FIG. 4 illustrates a flow diagram representing receiving content, obtaining a location of the aircraft, selecting content relative to the location, and displaying the content on an interior surface of an aircraft cabin.

FIG. 4 illustrates a flowchart 400 of the steps and process of an image display system. The image or content display system may be interconnected with an aircraft. Referring to block 401, the server may be configured to receive content, including at least one or more images and/or parametric data, associated with a flight trajectory of an aircraft. The flight trajectory may include information regarding the aircraft's flight schedule, direction, and/or orientation during a flight. Furthermore, the flight trajectory may also include information of the aircraft's pre-determined flight plan and/or rotation and position of the earth relative to the flight plan. In other words, the flight trajectory may include information associated with the path the aircraft and any additional information related to possible deviations the aircraft may make during its trip. The system may be configured to receive all of this information and the accompanying images that are related to the flight trajectory for storage and eventual display.

Referring to block 402, the location of the aircraft may be obtained. In one embodiment, obtaining the location of the aircraft may provide the necessary information for the image display system to select a subset of the one or more images from the on-board storage device in the aircraft. The selected images may represent the sky view of the obtained location of the aircraft. As the location of the aircraft changes, a second or another subset of the one or more images may be retrieved or selected from the storage device. The second subset of image may then also be displayed accordingly. If an unexpected location is obtained (i.e., a location deviating from the flight trajectory), the image display system may request, from the server or a computing system located on the ground, at least one or more images that are associated with the deviated or unexpected location of the aircraft. This way, images in the cabin may be updated in real-time. The unexpected location may include changes to the flight trajectory such as: banks, turns, and/or unexpected flight detours the aircraft has made.

Referring to block 403, the selection of a subset of the one or more images may include images that are based on the location of the aircraft relative to the flight trajectory. In other words, the location of the aircraft may represent a position of the flight trajectory. The flight trajectory also includes information of coordinates and positions that the aircraft may take while in-flight. This information was previously conveyed to the image display system to download the representative images of the flight trajectory. Thus, when the aircraft is in-flight, depending on the location of the aircraft, the image display system may select and/or synchronize a subset of the one or more stored images. Once selected, the image display system may then transfer these images to distributed rendering nodes for display.

Referring to block 404, the subset of the one or more images may be displayed to at least one interior surface of the aircraft via rendering nodes. The rendering nodes may receive the subset of the one or more images from an on-board storage system located in the aircraft itself. In one example embodiment, once the subset of content has been received, the rendering nodes may cache the images in a distributed fashion. As much as 300 Gigabytes (GB) of storage may be made available for each of the subset of the one or more received images. In another example embodiment, the rendering nodes, which are interconnected with individual display screens, may render or provide the subset of the content directly to the display screens. The preferred embodiment would provide the content, including images, throughout the interior surfaces of the cabin. This way, passengers may observe images of sky views, images of earth views, and/or 3D spatial images related to the aircraft's current location. The display screens may also be television screens, projector screens, or any other types of screens configured to display images. Furthermore, the resolution of the screens may be of any configuration. It is preferred that high resolution images are presented on a display screen configured with at least 1080p resolution. The images may also be presented to a single display screen located on a seat back or inside a premium class suite.

The features, functions, and advantages that have been discussed can be achieved independently in various embodiments or may be combined in yet other embodiments, further details of which can be seen with reference to the following description and drawings. The terminology used in the description of the invention herein is for the purpose of describing particular implementations only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used in the claims and throughout the application, the term "computing device," "distributed rendering nodes," or "rendering nodes should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit. Furthermore, the term "aircraft" should be construed broadly to encompass helicopters, private and passenger airplanes, cargo airplanes, and/or other transportation means.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

We claim:

1. A method for displaying content in an aircraft, the method comprising:
receiving content associated with a flight trajectory of the aircraft;
storing the content in an on-board storage system on the aircraft;
obtaining a location of the aircraft;
selecting a subset of the content based on the obtained location relative to the flight trajectory; and
displaying the subset of the content on at least one interior surface of the aircraft;
wherein the subset of the content displayed includes images comprising any one of three-dimensional (3D) spatial imagery, images of earth views, and images of sky views; and
wherein displaying the subset of the content comprises synchronizing the subset of the content displayed extracted from the on-board storage system for display on at least one interior surface while the aircraft is in-flight; and
wherein displaying the subset of the content further comprises updating, in real-time, the subset of the content based on changes to the flight trajectory, including any one of banks, turns, and unexpected flight detours.

2. The method of claim 1, further comprising:
receiving the content, including one or more images and parametric data, when the aircraft is on the ground.

3. The method of claim 2, wherein the content stored in the on-board storage system comprises at least one of: images and parametric data that have not previously been stored.

4. The method of claim 1, wherein the flight trajectory is calculated based on at least one of: a pre-determined flight plan for the aircraft and rotation and position of earth.

5. The method of claim 4, wherein the pre-determined flight plan further comprises information related to any one of: flight schedule, orientation, and direction of the aircraft.

6. The method of claim 1, wherein displaying the subset of the content further comprises rendering the subset of the content from a head-end server to at least one rendering node configured for display.

7. The method of claim 6, wherein the at least one rendering node is configured to perform any one of: image alignment, image scaling, image registration, and image stitching.

8. An image display system, comprising:
one or more memories having stored thereon computer-readable instructions that, upon execution by a computing device, cause the system to:
receive content associated with a flight trajectory of an aircraft;
store the content in an on-board storage system in the aircraft;
obtain a location of the aircraft;
select a subset of the content based on the obtained location relative to the flight trajectory; and
display the subset of the content on at least one interior surface of the aircraft;
wherein the subset of the content displayed includes images comprising any one of three-dimensional (3D) spatial imagery, images of earth views, and images of sky views; and
wherein displaying the subset of the content comprises synchronizing the subset of the content displayed extracted from the on-board storage system for display on at least one interior surface while the aircraft is in-flight; and wherein displaying the subset of the content further comprises updating, in real-time, the subset of the content based on changes to the flight trajectory, including any one of banks, turns, and unexpected flight detours.

9. The system of claim 8, further comprising:

receive the content, including at least one of one or more images or parametric data, when the aircraft is on the ground.

10. The system of claim 9, wherein the content stored in the on-board storage system comprises at least one of: images and parametric data that have not previously been stored.

11. The system of claim 8, wherein the flight trajectory is calculated based on at least one of: a pre-determined flight plan for the aircraft and rotation and position of earth.

12. The system of claim 11, wherein the pre-determined flight plan further comprises information related to any one of: flight schedule, orientation, and direction of the aircraft.

13. The system of claim 8, wherein display the subset of content further comprises synchronizing the subset of the content extracted from the on-board storage system for display on at least one interior surface while the aircraft is in-flight.

14. The system of claim 8, wherein the at least one rendering node is configured to perform any one of: image alignment, image scaling, image registration, image processing and image stitching.

15. The system of claim 14, wherein the at least one rendering node is configured to utilize computer graphic generated imagery to augment real images or create other virtual world imagery based on aircraft position.

\* \* \* \* \*